United States Patent [19]

Fabian

[11] 4,019,867

[45] Apr. 26, 1977

[54] APPARATUS FOR THE CONTINUOUS PURIFICATION OF GASES CONTAMINATED WITH TRITIUM

[75] Inventor: Hans Fabian, Hanau, Germany

[73] Assignee: Nukem G.m.b.H., Grossauheim, Germany

[22] Filed: Dec. 27, 1973

[21] Appl. No.: 428,697

[30] Foreign Application Priority Data

June 22, 1973 Germany .................... 7323277[U]

[52] U.S. Cl. ................................ 23/260; 23/288 R; 23/288 F; 55/66; 423/248

[51] Int. Cl.² ...................... B01D 53/00; B01J 8/00; C01B 1/30; C01B 1/32

[58] Field of Search ................. 423/248; 55/66, 71; 176/37; 23/288 F, 288 FB, 288 R, 260; 2/288 R

[56] References Cited

UNITED STATES PATENTS

| | | | |
|---|---|---|---|
| 1,929,659 | 10/1933 | Trumble et al. | 23/288 F B UX |
| 2,339,846 | 1/1944 | Eastman et al. | 23/288 R X |
| 3,290,119 | 12/1966 | Ohlegren et al. | 55/66 X |
| 3,294,643 | 12/1966 | Guernsey | 176/37 |
| 3,395,972 | 8/1968 | Hardison | 23/288 F |
| 3,457,040 | 7/1969 | Jennings | 23/288 F |
| 3,497,312 | 2/1970 | Zeff et al. | 23/288 F UX |
| 3,560,158 | 2/1971 | Benson | 23/230 |
| 3,598,535 | 8/1971 | Wennerberg | 23/288 R X |
| 3,762,134 | 10/1973 | St. Cyr et al. | 55/71 |
| 3,848,067 | 11/1974 | Cooper | 423/248 |
| 3,871,842 | 3/1975 | Quieser et al. | 55/66 X |

FOREIGN PATENTS OR APPLICATIONS

| | | | |
|---|---|---|---|
| 915,773 | 1/1963 | United Kingdom | 176/37 |

OTHER PUBLICATIONS

Chemical Engineering Handbook—4th Edition, Perry et al., pp. 21–24 and 32 (Index).

*Primary Examiner*—Barry S. Richman
*Assistant Examiner*—Michael S. Marcus
*Attorney, Agent, or Firm*—Cushman, Darby & Cushman

[57] ABSTRACT

Apparatus for the continuous purification of gases contaminated with tritium by catalytic burning of tritium enriched hydrogen in a catalytic furnace and subsequent absorption of the tritium containing oxidation product. The apparatus has at least two gas storage containers which can be filled selectively by operating appropriately arranged valves, at least one catalytic furnace and at least one absorption plant for the oxidation product formed by way of which the gas storage container can be emptied selectively by appropriately arranged valves.

4 Claims, 1 Drawing Figure

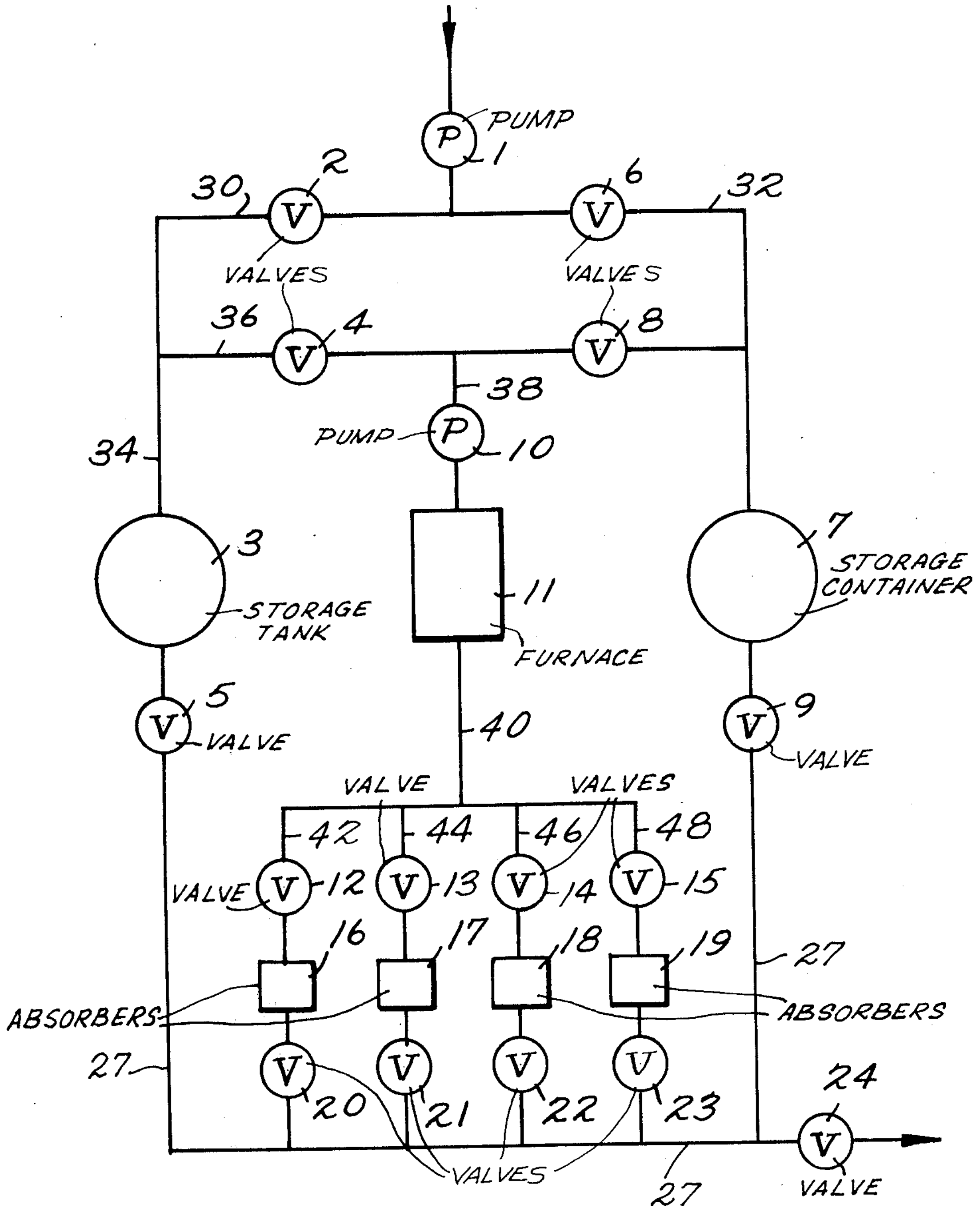
PUMP
1
2
30
6
32
VALVES
VALVES
36
4
8
38
PUMP
10
34
3
STORAGE TANK
11
FURNACE
7
STORAGE CONTAINER
5
VALVE
40
9
VALVE
VALVE
VALVES
42
44
46
48
VALVE
12
13
14
15
16
17
18
19
27
ABSORBERS
ABSORBERS
27
20
21
22
23
24
VALVES
27
VALVE

APPARATUS FOR THE CONTINUOUS PURIFICATION OF GASES CONTAMINATED WITH TRITIUM

BACKGROUND AND SUMMARY OF THE INVENTION

The object of the present invention is an apparatus for the continuous removal of tritium enriched gases, especially tritium enriched hydrogen from industrial nuclear plants.

According to the state of the art today the tritium activity resulting in industrial nuclear plants, as for example neutron generators, is mostly drawn off from the plants into the atmosphere by way of waste gas lines. The tritium poisons the air and since tritium adds on to or builds into water vapor (or steam) the activity returns to the earth's upper surface, for example through rain water and can thereby cause environmental poisoning.

The object of the invention is therefore to develop an apparatus which makes possible the removal of hydrogen, especially of tritium, quantitatively and continuously from waste gases and thereby guarantee the retaining of purity of the air. This is accomplished by leading the tritium contaminated gas into a plant which contains at least two gas storage containers which can be filled selectively by way of corresponding valves and selectively, independent of each other can be emptied by way of at least one catalytic furnace and one or more absorption devices whereby simultaneously there is always filled one or more gas storage containers and there is always emptied one or more storage containers. While there must be at least two gas storage containers there is no upper limit on the number of storage containers other than the factor of increasing plant expense. Similarly, while there must be at least one catalytic furnace, there can be two or more such furnaces. Likewise, while there must be at least one absorption device, there can be two or more such devices. In the catalytic furnace the hydrogen gas is changed to water with the help of a catalyst, for example copper oxide (cupric oxide) and the water formed is bound to solid substances, for example phosphorous pentoxide as drying agents. Other conventional catalysts and solid drying agents can be employed. Analagously, in a given case, the oxygen and nitrogen resulting from the industrial nuclear plant can be chemically bound so that the industrial nuclear plant does not set free any waste gas.

BRIEF DESCRIPTION OF THE DRAWING

The single FIGURE of the drawings illustrate schematically one form of a plant built according to the invention.

DETAILED DESCRIPTION OF THE INVENTION

Referring more specifically to the drawings, tritium contaminated gas is led off from a source thereof, such as an industrial nuclear plant, and goes by way of pump 1, valve 2, line 30 and line 34 into a gas storage container or tank 3 where it is subjected to pressure. When gas storage container 3 is filled then gas storage container 7 is loaded by opening valve 6 and thereby allowing gas to flow through line 32. When valve 6 is opened, valves 2, 8 and 9 must be closed. Simultaneously, the gas contents of storage container 3 are pressured by way of line 34, line 36, valve 4, line 38 and pump 10 into catalytic furnace 11, which preferably contains copper oxide (cupric oxide) as catalyst. Lines 30, 32 and 34 together form a first conduit means, while valves 2, 6 form a first valve means. Line 36 forms a second conduit means, and valves 4, 8 a second valve means. Line 38 forms a third conduit means. In furnace 11 the hydrogen together with the tritium is changed by oxidation into steam which is removed from the gas stream in absorption devices 16, 17, 18 and 19 after passing through lines 40, 42, 44, 46 and 48 and valves 12, 13, 14 and 15. The absorption devices 16, 17, 18 and 19 are so operated by way of valves 12, 13, 14 and 15 and 20, 21, 22 and 23, that they can either be used individually or several (two or more) can be used together. In this way, it is possible also to continuously regenerate the absorption agent. Lines 40, 42, 44, 46 and 48 together form a fourth conduit means, and valves 12–15 form a fourth valve means. By way of valve 5 the gas can also be led repeatedly through the catalytic furnace 11 and the absorption devices. The purified gas stream after leaving the absorption devices goes by way of valve 24 into the atmosphere or can be otherwise disposed of as desired.

Valves 5 and 9, which form a third valve means disposed in a fifth conduit means, recycling line 27, are required for the independent filling and emptying of the two stage containers 3 and 7. Therefore, they cannot be considered individually in their function but only in cooperation with the other valves. If the storage container 3 is to be emptied or the gas charge purified then valve 5 should not be opened but valve 4 is opened. As is evident, valves 5 and 9 are seldom used and are usually closed. They are important, however, in case the gas to be purified must be sent through the combustion-absorption cycle several times.

EXAMPLE

Tritium was continuously set free in the production of neutrons in neutron generators and together with other waste gases pumped from the plant. In powerful power plants the tritium accumulation can be up to 10 Ci/hour. To avoid tritium contamination of the environment the waste gas must be led to the tritium absorption apparatus of the invention described above and shown in the drawings and the tritium after oxidation to tritium containing water in the furnace containing copper oxide catalyst is removed by absorption on a drying agent, e.g., phosphorus pentoxide. After a purification time of several hours the tritium content in the waste gas is reduced from $10^{-3}$ to $10^{-5}$ Ci/m$^3$. Continuous operation of the apparatus can be accomplished by alternatingly filling and purifying with the help of both buffer containers.

Naturally the plant of the invention can also have more than two gas storage containers, several catalytic furnaces and more or less than four absorption plants. The purification process can be operated automatically by means of a pressure regulator or a timer which is reversed from one to the other gas storage container with a corresponding valve.

With the help of the new plant of the invention, it is possible to completely, and, in a given case, automatically completely continuously remove hydrogen or tritium from gases.

As used in the claims, the term fluid water is generic to liquid water and gaseous water (water vapor or steam).

What is claimed is:

1. Apparatus for the continuous purification of gases contaminated with tritium by the catalytic burning of tritium enriched hydrogen in a catalytic furnace, said apparatus comprising a source of tritium contaminated gas, at least first and second gas storage containers, at least one catalytic furnace for burning tritium from tritium contaminated gas and hydrogen to form water, a pump in operative communication with each of said gas storage containers and said catalytic furnace, first conduit means for operatively connecting said source to said first and second storage containers, second conduit means for connecting said storage containers to each other, third conduit means for connecting said second conduit means to said catalytic furnace, said pump being disposed in said third conduit means, means for absorbing the fluid water formed in said catalytic furnace, said means including at least one absorption unit, fourth conduit means connecting said absorption unit with said furnace, first valve means disposed in said first conduit means for permitting gas contaminated with tritium to pass from said source of contaminated gas to one of said storage containers, while selectively preventing tritium contaminated gas from entering the other of said storage containers, and second valve means located within said second conduit means for selectively permitting gas to pass from said first storage container to said catalytic furnace while selectively preventing the gas from passing from said second storage container to said catalytic furnace and for reversing the process whereby gas is prevented from passing from said first storage container to said catalytic furnace and gas is permitted to pass from said second storage container to said furnace.

2. Apparatus as recited in claim 1 further comprising fifth conduit means for connecting said absorption unit back to said first and said second storage containers for either emptying the storage tanks or for recycling the treated gas for further purification, and third valve means disposed in said fifth conduit means for selectively permitting gas to pass from said absorption unit back to said first storage container, while selectively preventing gas from passing from said absorption unit back to said second storage container, and for reversing the process whereby gas is prevented from passing from said absorption unit back to said first storage container while it is permitted to pass from said absorption unit back to said second storage container.

3. Apparatus as recited in claim 1, wherein said absorption unit includes a solid absorbent material which will absorb water.

4. Apparatus as recited in claim 1, wherein said absorbing means comprises a plurality of absorption units, and wherein said apparatus further comprises fourth valve means disposed in said fourth conduit means for selectively permitting effluent from said catalytic furnace to at least one absorption unit while selectively simultaneously preventing effluent from said furnace from passing to another of said absorption units.

* * * * *